(12) United States Patent
Arnold

(10) Patent No.: US 7,628,287 B1
(45) Date of Patent: Dec. 8, 2009

(54) REUSABLE CONTAINER UNIT HAVING SPACED PROTECTIVE HOUSINGS

(76) Inventor: William M. Arnold, P.O. Box 17084, Bristol, VA (US) 24209

( * ) Notice: Subject to any disclaimer, the term of this patent is extended or adjusted under 35 U.S.C. 154(b) by 444 days.

(21) Appl. No.: 11/126,099

(22) Filed: May 10, 2005

Related U.S. Application Data

(60) Provisional application No. 60/569,753, filed on May 10, 2004.

(51) Int. Cl.
- B65D 1/40 (2006.01)
- B65D 3/22 (2006.01)
- B65D 6/14 (2006.01)

(52) U.S. Cl. ............ 220/62.22; 220/62.18; 220/62.19
(58) Field of Classification Search .............. 220/62.22, 220/23.91, 592.26; 206/523, 591
See application file for complete search history.

(56) References Cited

U.S. PATENT DOCUMENTS

| | | | |
|---|---|---|---|
| 4,190,160 A * | 2/1980 | Andersen et al. | 206/591 |
| 4,588,088 A * | 5/1986 | Allen | 206/525 |
| 4,594,513 A * | 6/1986 | Suzuki et al. | 250/506.1 |
| 6,857,812 B1 * | 2/2005 | Kergen | 403/274 |

* cited by examiner

*Primary Examiner*—Anthony D Stashick
*Assistant Examiner*—Shawn M Braden

(57) ABSTRACT

A hazardous material transport container employing a conventional 55 gal. ring ribbed drum in which a protective shell is slidingly fitted, wherein the shell contains an inner containment vessel, wherein protective spacings are provided between the shell and the vessel and between the shell and the drum, wherein a plurality of elongated strengthening ribs are affixed generally longitudinally to the outer surface of the shell and lie closely adjacent to but slidable within the inner surface of the drum, wherein an upper portion of the shell is welded to a top inner portion of the drum wall, and wherein thermal insulating and impact resistant materials substantially fill the protective spaces.

17 Claims, 2 Drawing Sheets

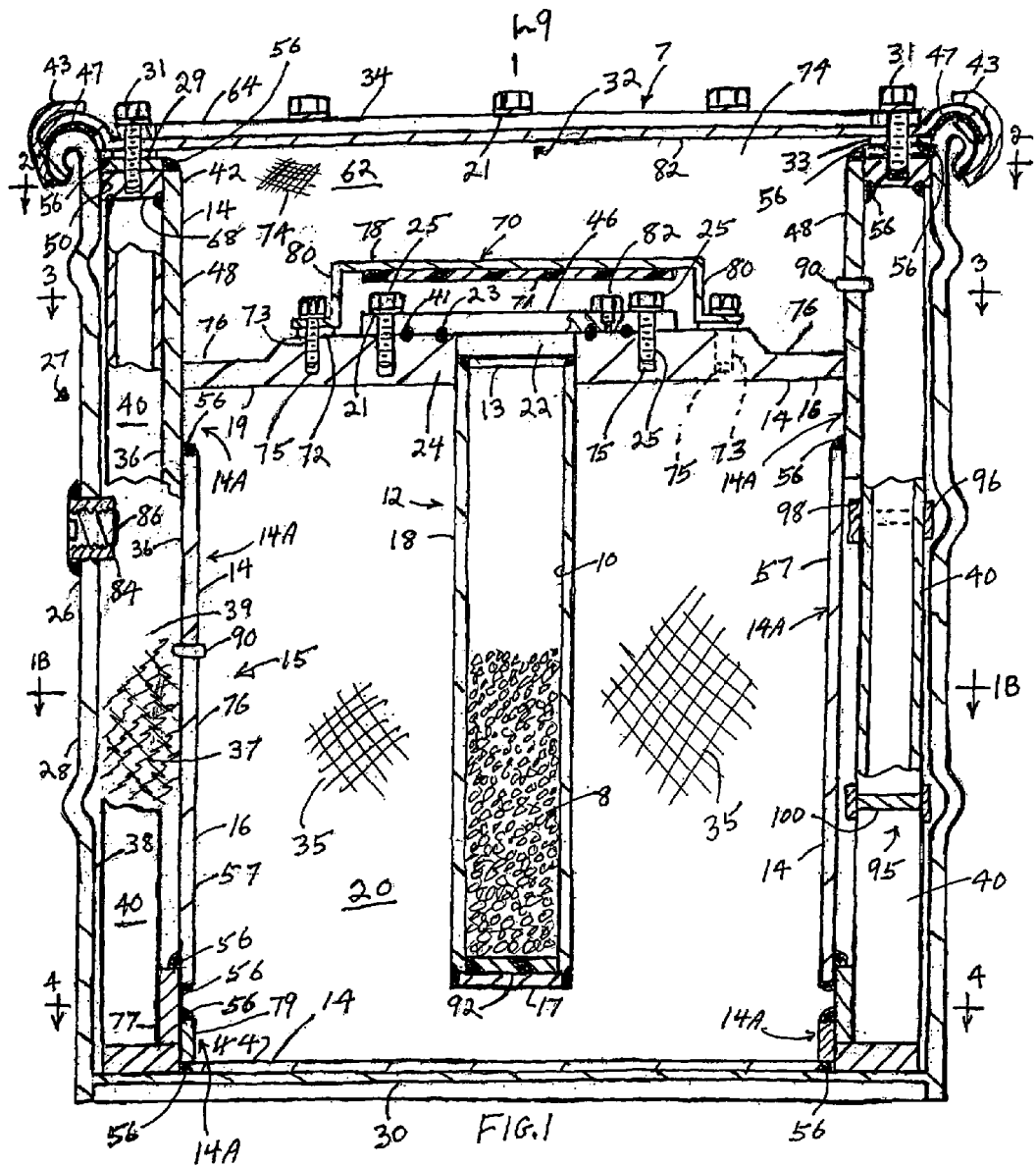

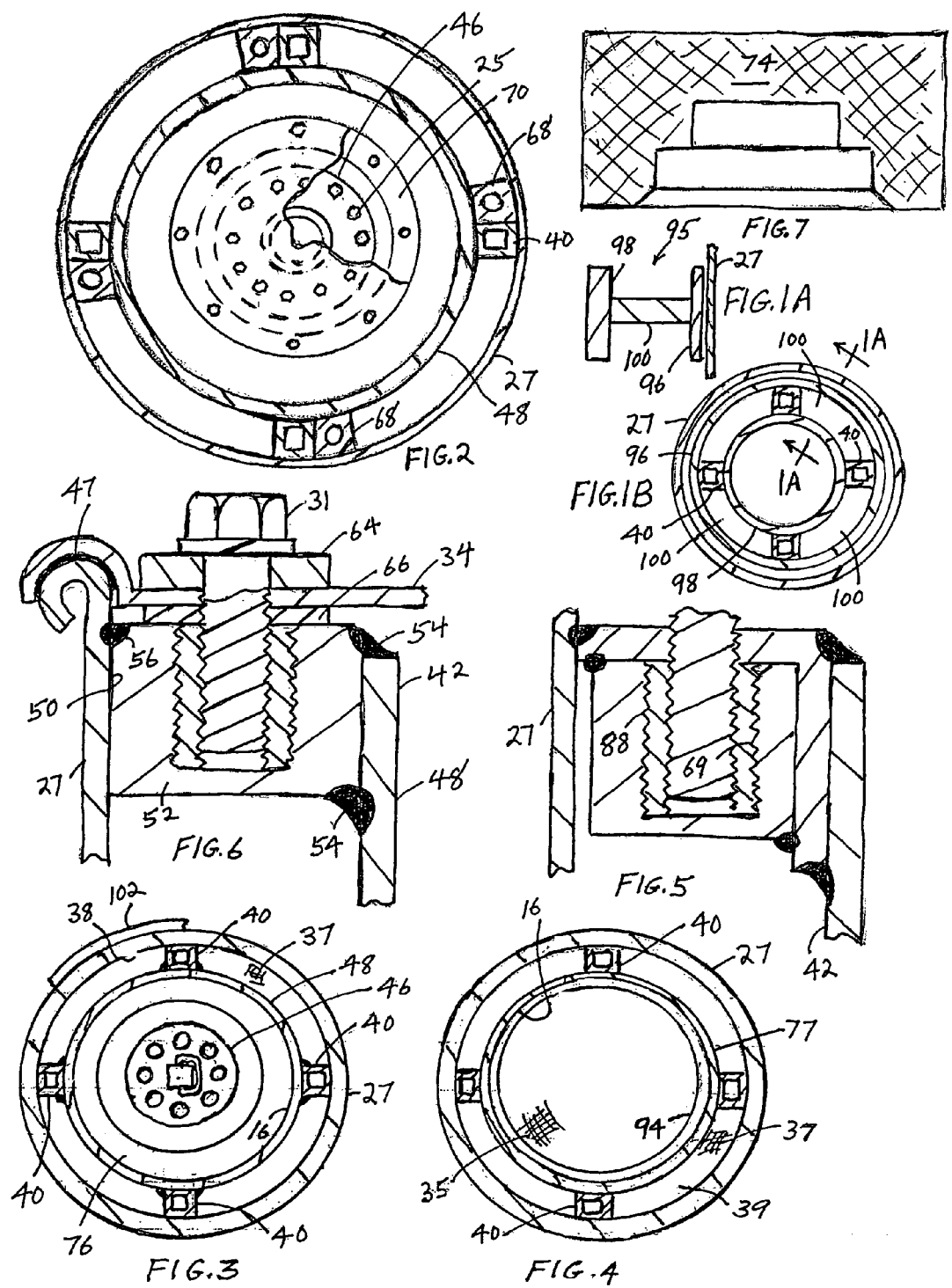

REUSABLE CONTAINER UNIT HAVING SPACED PROTECTIVE HOUSINGS

This application claims priority under 35 U.S.C. 119(e)(1) based on Applicants Provisional U.S. Patent Application Ser. No. 60/569,753 filed May 10, 2004 and titled "REUSABLE CONTAINER UNIT HAVING SPACED PROTECTIVE HOUSINGS".

BACKGROUND OF THE INVENTION

1. Field

The present invention is for containers having markedly simplified construction and special utility for the bulk shipment of fluid or solid materials which may be of a toxic or otherwise hazardous nature including radioactive materials. The invention especially concerns novel construction and features which allow repeated reuse of the container even though it is subjected to rough treatment which normally would puncture or otherwise seriously damage such containers as are presently in use for bulk materials transport.

Of great concern to the hazardous material transporter, user, Federal Regulators and to the environment is the relative ease with which such conventional containers can be damaged in accidents, often resulting in leaks and spills of toxic or otherwise dangerous chemicals. Such incidents also occur where containers are moved about and stacked or loaded and unloaded on vehicles by fork-lift trucks or the like. During such operations, puncture or other severe damage to the container often occurs. As a result of these experiences, Federal Regulations now substantially restrict the reuse of chemical containers and costly disposal thereof is the necessary consequence.

2. Prior Art

For an even more onerous use of such containers there has been a need for a new generation of shipping container or packages for the nuclear industry for many years in that the presently utilized fleet of shipping containers is based on 40 year old technology and many of them no longer meet the current regulations such as those regulations recited for packages in 10 CFR 71.71 et seq. Due to recent changes in the regulations many older packages are obsolete due to their inability to successfully pass new more stringent requirements. Several of the staple packages are being removed as options for transport and the industry is in need of a cost effective, safe and reliable alternative. Such containers or packages which find utility for many applications but which may be unsuited for transporting, e.g., uranium dioxide, uranyl nitrate hex hydrate, U233, PU/PuO$_2$/MOX and various neutron sources, are shown in U.S. Pat. Nos. 5,595,319; 2,148,278; 2,575,283; 2,596,244; 3,197,066; 3,294,271; 4,184,609; 4,712,711; 4,986,436; and 4,989,447.

The present container construction markedly improves the strength and structural integrity of hazardous material containers and makes them reusable. In this regard, the present container can utilize a conventional ring ribbed 55 gal. drum or the like and slide down into it a substantially complete containment vessel and protective shell which has longitudinal strengthening ribs on the exterior longitudinal surface of the shell, which structure facilitates the final assembly and welding together of the container components including the 55 gal. drum.

SUMMARY OF THE INVENTION

In one preferred embodiment of the present container construction a conventional 55 gal. ring ribbed steel drum having a longitudinal axis is slidingly fitted with an inner protective shell containing a material containment vessel, wherein the shell is spaced from the vessel over all but a top open end portion of the vessel to provide a protective space, a wall section of the shell being affixed to said end portion, wherein a bolted closure cap is provided for sealing said end portion, wherein a drum cover is provided for sealing an open top of said drum, wherein said wall section is spaced downwardly in said drum from said cover to provide another protective space, wherein a plurality of elongated strengthening ribs are affixed generally longitudinally to an outer surface of the shell and lie closely adjacent to but slidable longitudinally within said drum and thereby providing another protective space between the drum wall and said shell, wherein an upper portion of said shell is welded to a top portion of said drum wall, and wherein thermal insulating and impact resistant materials substantially fill said protective spaces.

BRIEF DESCRIPTION OF THE DRAWINGS

The invention will be understood further from the drawings and description, wherein the dimensions are not to scale or proportion and certain dimensions are enlarged for clarity, and wherein:

FIG. 1 is a partially longitudinal cross-section of a preferred embodiment of the invention;

FIG. 1A is a cross-sectional view taken along line 1A-1A in FIG. 1B;

FIG. 1B is a cross-sectional view taken along line 1B-1B in FIG. 1 with vessel 12 removed and showing principal wall structures and vertical reinforcing members;

FIG. 2 is a cross-section taken along line 2-2 in FIG. 1 with portions broken away for clarity;

FIG. 3 is a cross-sectional view taken along line 3-3 in FIG. 1 with cap structure 70 removed;

FIG. 4 is a cross-sectional view taken along line 4-4 in FIG. 1;

FIG. 5 is an enlarged top ring portion of the protective shell showing further details of construction;

FIG. 6 is a view as in FIG. 5 showing a variation in the top ring construction; and FIG. 7 is a longitudinal cross-sectional view of the polyurethane plug 74.

DETAILED DESCRIPTION

With reference to the drawings and the claims herein, the present container 7 for hazardous materials 8 is of all steel construction except for protective foam, seals and the like and having a longitudinal axis 9. A substantially closed and continuous first wall means 10 provides an inner containment vessel 12 for said material and has an open top portion 13. A substantially closed and continuous second wall means 14 provides a protective shell 15 substantially surrounding vessel 12 and having its inner surface portions such as 16 radially spaced from all but the open top portion 13 of outer surface portions 18 of the vessel to provide a first protective spacing 20 there between. An aperture 22 is formed thru this second wall means 14 at a top portion 24 thereof generally longitudinally of shell 15 for allowing insertion into and welding of open top portion 13 of said vessel to top portion 24. A cover 46 (blind flange) is adapted to be removably affixed to top portion 24 as with bolts 25 to cover aperture 22. Sealing means such as elastomeric sealing O-rings 23 and 41 are provided to hermetically seal vessel 12.

A third wall means 26 provides a sealable drum 27, preferably a conventional ribbed 55 gallon drum having side portions 28, a bottom 30, an open top 32, and a sealable drum lid 34 for closing said open top, wherein outer surface portions 36 of said shell 15 are spaced from inner surface portions 38 of said drum over a major portion thereof to provide a second protective spacing 39 therebetween. Shell 15 has a plurality of strengthening ribs 40 affixed to and spaced around segments of outer surface portions 36 of the shell and extending generally longitudinally thereof substantially from the top 42 to the bottom 44 or reinforcing plate of the shell.

The construction of second wall means 14 provides a cylindrical side wall portion 48 which extends longitudinally upwardly beyond top portion 24 and is provided at its top 42 with a ring member 29 which is affixed to an upper inner surface portion 50 of side portion 28 of drum 27, preferably by welding, whereby a third protective spacing 62 is provided. Ring member 29, as shown in FIG. 6, may comprise a heavy steel annular reinforcing rim 52 welded as at 54 to top portion 42 of side wall portion 48 inner surface portion 50 of the drum as at 56. Wall means 14 is shown as preferably having a liner section 57 which, during fabrication is welded to 48 and to a bottom reinforcing structure 79 comprising a circular rim member 77 which is part of fabricated lower reinforcing ring comprised of 77 and other circular rim members 94 and 96 and bottom 44 whereby the exact length of the shell is more easily attained. One could, however, construct 48 and 57 as a unitary cylindrical unit of uniform diameter and welded to item 77. It is noted that the welds are denoted 56 generally.

The drum lid 34 preferably has a heavy steel reinforcing flange 64 welded thereto and a top annular gasket 33 of, e.g., heat resistant silicone rubber or neoprene material is positioned between the lid and ring member 29. A plurality, e.g., 4-10 blind nuts (insert holders) 68 (or 52) are welded to the top portion 42 of wall 14 underneath ring member 29 and aligned holes for bolts 31 are formed through annular reinforcing flange 64, lid 34, gasket 33 ring member 29 and into blind nuts 68 to provide threaded bolt or thread insert 88 receiving sockets 69 in the nuts. Where ring member 29 comprises a heavy solid ring 52 as shown in FIG. 7, the separate nuts 68 are not needed and the blind bolt or insert hole threads are formed directly into ring 52. It is noted that nuts 68 as well as the threaded holes in ring 52 can be used to receive thread inserts 88 in situations where, e.g., especially hardened threads and bolts are required. Lock washers 21, of course, are preferred for all bolts shown in the drawings. A heat resistant sealing material 47 provides an annular gasket for lid 34.

In a preferred embodiment a cap structure generally designated 70 is used for extra protection and preferably is provided with an elastomeric, e.g., neoprene pad 71. This structure affords extra force protection to blind flange 46 as well as hermetic sealing by, e.g., annular silicone rubber gasket 72. Bolts 73 threaded into blind apertures 75 affix 70 to top portion 24. Further, protective spacing 62 is filled by a thermal and impact protective removable polyurethane plug 74 (FIG. 7) which is configured and dimensioned to snugly engage substantially all inner structures such as 48, 76, 78, 80 and 82 which define spacing 62.

Spacing 20 is preferably filled with in-situ foamed closed cell polyurethane 35, and spacings 39 between the ribs 40 are preferably filled with a ceramic blanket 37, the compositions of which are more fully described below.

The protective shell is preferably constructed from the components comprising upper wall portion 48, intermediate wall portion or liner 76, bottom reinforcing structure 79 and the heavy top portion 24. Components 48, 76, 77, 94 and 96 preferably are rolled steel sections with their ends joint welded to provide annular structures having fairly close tolerance dimensions of, e.g., 0.025 to 0.125 in. While other construction techniques can be employed, it will hereinafter become evident that by starting with these separate component items, the assembly, welding and polyurethane foaming operations are facilitated.

The vertical reinforcing members 40 are preferably tied together in a circular array as shown in FIGS. 1A and 1B by means of a reinforcing ring structure generally designated 95 and comprising an outer rim 96 and an inner rim 98 welded to the peripheral surfaces of members 40. In between rims 96 and 98 are semi-circular web members 100 welded to 96 and 98 and to the abutting surfaces of members 40. Two such structures 95 are shown, preferably in the areas of the drum ribs 102, however any number of the structure can be provided.

With reference to the claims herein, a preferred embodiment of the present invention is defined as a reusable container (7) for hazardous material (8), said container having high impact resistance and leak containment characteristics and being readily handleable by conventional fork lift or the like equipment, said container having a longitudinal axis (9) and comprising a substantially closed and continuous first wall means (10) providing an inner containment vessel (12) for said material and having an open top portion (13), a substantially closed and continuous second wall means (14) providing a protective shell (15) substantially surrounding said vessel and having inner surface portions (16) radially spaced from at least a major portion of outer surface portions (18) of said vessel to provide a first protective spacing (20) there between, aperture means (22) formed thru said second wall means (14) at a top portion (24) thereof generally longitudinally of said shell (15) for allowing insertion into and welding of said open top portion (13) of said vessel to said top portion (24) of said shell (15), a vessel cover (46) adapted to be removably affixed to said top portion (24) as with bolts (25) to cover said aperture means (22), third wall means (26) providing a sealable drum (27) having side portions (28), a bottom (30), an open top (32), and sealable drum lid means (34) for closing said open top, wherein said shell (15) has a plurality of strengthening rib means (40) affixed to and spaced around segments of said outer surface portions (36) of said shell (15) and extending generally longitudinally thereof substantially from the top (42) to the bottom (44) of said shell, whereby said outer surface portions (36) of said shell (15) are spaced from inner surface portions (38) of said drum over a major portion thereof to provide a second protective spacing (39) there between, wherein the construction of said second wall means (14) provides a cylindrical side wall portion (48) which extends longitudinally upwardly beyond said top portion (24) and is provided at its top (42) with a ring member (29) which is affixed to an upper inner surface portion (50) of said side portion (28) of said drum (27), and wherein protective material is provided in said spacings.

The closed cell polyurethane foam used herein has a density range of 5.0 to 7.0 pounds per cubic foot (PCF), and analyzed for the following elemental percentages, each with a tolerance of ±10%:

Hydrogen 6.7%

Carbon 61.7%

Oxygen 26.1%

Nitrogen 5.2%

Other 0.3%

Density measurements of the analytical test samples were performed in accordance with ASTM D-1622. Density measurement of the polyurethane foam as installed was done by simple calculation of the foam weight divided by the container cavity volume.

Compressive strength was tested in accordance with ASTM D-1621, Compressive Properties of Rigid Cellular Plastics. Densities in pounds/ft$^3$ (PCF) of 5.0 and 7.0 gave compressive strengths within a range (PSI) of 85-300.

Thermal conductivity measurements were performed in accordance with ASTM C518. Based upon test results the thermal conductivity of the foam K Factor=4.05 Btu-in/(h-sq ft-CF).

Flame retarding testing was performed in accordance with ASTM E84. The flame spread classification was 830 and the smoke developed classification was 300.

The foam was tested for Water Absorption in accordance with ASTM C209 Section 14 and the Moisture Content in accordance with ASTM C209 Section 18. The CI1 Urethane foam is a Closed Cell foam. The moisture content of the foam was 2.10%. Water absorption was 0.46% after 2 hours and 0.78% after 24 hours on a volume water/volume product basis.

Based on testing performed on samples with mid-range densities of 6.0 pcf, leach able chlorides were <25 ppm and total leach able chlorides were also <25 ppm. Chloride content in any event should be less than 100 ppm.

Urethane foam resins and urethane foam and other raw materials and processing chemicals should be stored at room temperature. The urethane foam was formed of two components selected for a rigid polyurethane system that produces a hard foam with a nominal, free rinse core density of 5 to 7 pcf. The system should be a water blown foam formula with a polymeric MDI as the "A" component. The flame retardant should be a mono-pentaerythritol based material.

The rigid polyurethane foam is tailored for insulation and is produced in slab or bun form. The raw material typically is PMDI and the blowing agent typically is FC-11, (bp 23.8° C.). Tertiary amines and organotin compounds, e.g., dibutyltin dilaurate, are usually employed as catalysts. The polyols are preblended with surfactant, catalysts and fire retardants. The other component is the isocyanate and the catalysts can be added to either component.

Foam in Place Procedure (for Protective Spacing 20):
  Calculate the amount of foam required for volume and add 10%.
  Weigh container to be foamed—Record reading.
  Weigh raw materials for a 7% flame retardant formulation.
  Adjust temperature of container to be foamed.
  Pre-mix flame retardant with a component in a container that will hold all of the components.
  Add other components and mix.
  Pour into container cavity.
  Watch foam rise for any abnormalities.
  When the rise is complete, allow foam to cure before cutting.
  Trim excess foam from container.
  Weigh foamed container.
  Calculate density of the foam in the container based on container void volume and net weight of the foam installed.

Mold Fabrication Foam Procedure (For Plug 74)
  This procedure is to be used for foaming molds, blocks or buns of material to be cut to a particular finished component part to be used in final container.
  Calculate the amount of foam required for the mold.
  Adjust the mold temperature.
  Weigh out the raw materials.
  Pre-mix flame retardant and a component (usually with the isocyanate) of the urethane system in a container that will hold all components.
  Add other component (polyol) and mix.
  Pour evenly into mold.
  Watch for abnormalities.
  Once the rise is complete, record total rise height.
  Once the foam has cured, cut to specified shape.
  As required take sample and calculate pcf.

The protective material used for filling protective spacing 39 is a chemical resistant thermal barrier blanket 1.5 in. thick and weighing 8 lbs/ft$^3$, and consisting of high $Al_2O_3$ and $SiO_2$ content ceramic fiber spun from molten mineral raw material and having average fiber lengths of 8 inches with substantially uniform diameter. Such blankets are marketed under the name CER-WOOL®, by Vesuvius USA Corporation of Buffalo, N.Y.

Further specifications for the present CI-1 container are as follows:

| ITEM | WEIGHT KGS | WEIGHT LBS |
|---|---|---|
| 1. Relevant Weights of A Loaded CI-1 Shipping Container | | |
| CI-1 (Container per se) | | 290 |
| Maximum load per Vessel | | 100 |
| Maximum Gross Weight Of Loaded Container | | 390 |
| 1. MATERIALS OF CONSTRUCTION | | |
| 55-Gallon Drum | 16 Ga. C/S (Carbon Steel) | UNIA2/X400/S |
| Closure Ring | 12 Ga. C/S | UNIA2/X400/S |
| Drum Bolt | C/S | SAE I429 Grade 5 |
| Drum Gasket | EPDM Closed Cell Rubber | |
| O-Rings | Silicone | ASM 3304 F |
| Flat Gaskets | Silicone | AMS 3195, MILR 46089 or Equal |
| Inner Pad | Neoprene Rubber | ASTM D-2000 SAE J200, MILR-33065, or Equal |
| Sheet | C/S | ASTM A1011 |
| Plate | C/S | ASTM A36 |
| Angles | C/S | ASTM A36 |
| Square Tubing | C/S | ASTM A500 |
| Thread Inserts | C/S | Fastenal EZLOK Part No. 60160 or Equal |
| Closure Bolts | Clad C/S | ASTM A449 Type 1 Grade 5 |
| Lock Washers | Clad C/S | |
| Insulation | Ceramic Fiber Blanket/Board | |
| Vent Plug | Acetate | ASTM 300 Series |

The following chart gives specific preferred compositions and dimensions of structural items as numbered and as shown in the drawings and employed in the construction of the present container.

Preferred Assembly Procedure

Inner Vessel Assembly:
  1. Cut Tube of vessel 12 to proper length.
  2. Weld tube bottom end cap 17 to vessel tube.
  3. Machine the slip-on flange 24.
  4. Fit and weld slip-on flange to top of vessel tube.
  5. Machine vessel cover 46 (blind flange).
  6. Fit and weld together the rolled caps angle ring 80 and the cap plate 78.

Inner Container Assembly:
1. Cut, roll and weld side wall 48 to appropriate diameter.
2. Fit and weld 48 to top ring 29.
3. Fit and weld flange (top portions) 24 to 48.
4. Fit and weld insert holders (blind nuts) 68 to top ring assembly 29 and to 48.
5. Roll and weld bottom angle 77.
6. Fit and weld square tubing 40 (to obtain the proper height of protective shell 15) to top ring assembly and bottom rolled angle ring 77.
7. Position the partial assembly and fit and weld liner section 14 to 48 and to bottom angle ring 77.
8. Paint inside areas of inner vessel if required.
9. Cut and place the Cer-Wool paper against the inside bottom 19 of item 24 prior to foaming.
10. Foam the first protective spacing 20.
11. Cut excess foam off.
12. Cut and place Cer-Wool paper onto the top of the cut surface of the poured foam in spacing 20.
13. Close the foam space 20 by fitting and welding bottom reinforcement plate 80 to bottom angle ring 77.
14. Install thread inserts 45 in the slip-on flange 24.
15. Perform leak test on containment vessel 12 as required.

Final Assembly
1. Install vent plug pushes 90 (heat fusible plastic for internal pressure relief).
2. Wrap outside shell 15 between ribs 40 with Cer-Wool blanket.
3. Slide the shell into the outer 55-gallon drum 27.
4. Weld the shell top ring member 29 to the drum at the top of the shell assembly.
5. Cut hole, in side of drum for the vent plug coupling 84.
6. Fit and weld coupling 84 to the drum 27.
7. Install the thread inserts 88 into top insert holders (blind nuts) 68 as required.
8. Fit and weld the reinforcing flange 64 to the drum lid 34.
9. Clean as needed and paint if required.
10. Install all gaskets and pad 71.
11. Install bolts and close cover 46 and cap structure 70.
12. Insert polyurethane plug 74 in spacing 62.
13. Close outer drum lid and torque lid bolts, affix lid closure ring 43 against lid seal 47 and torque its clamping nut for transport.
14. Weigh and stencil as required.
15. Attach Nameplate.

A Hypothetical Accident Test Series was executed in accordance with CFR 71, Subpart F and IAEA Safety Series TS-R-1 as required for government approval of such containers. The test package (loaded container) was manufactured in accordance with approved drawings substantially as described herein and was designed for shipment of solid-form high-enriched uranium compounds, metals and uranyl nitrate crystals. It consists of a 5" OD×26.5" tall canister (vessel 12), surrounded by insulation and an outer 55-gallon drum, with overall dimensions of approximately 24" OD×35" tall. There are a total of 21 bolts utilized for the three separate closures. Ceramic Fibers and polyurethane foam make up the insulation materials of the package. The vessel is sealed by use of a set of leak testable o-rings, with the inner vessel acting as the containment boundary.

All testing was carried out by Southwest Research Institutes (SwRI's) appropriate department personnel and witnessed by their Quality Assurance Department under the direction of Century Industries and the SwRI Project Management Team in accordance with the test plan.

1. The test package was inspected for any pre-test damage and found to be acceptable.
2. The package was weighed and loaded using 90.8 pounds of new steel shot as a test median.
3. The tare weight was 299.2 pounds, with the total gross weight of the package at 390 pounds.
4. O-rings were installed and the cover (46) positioned and torqued as required to 33 ft-lb using an alternating pattern.
5. A helium leak test was performed using equipment that was calibrated to a sensitivity of $2.2 \times 10^{-8}$ std-cc/secs. The test method conformed to the required leak test standards, with an acceptable pre-test leak rate between $32.-4.2 \times 10^{-8}$ std-cc/secs over a 5 minute test time.
6. The secondary cover (70) and seals (72) were positioned and torqued to the same required torque of 33 ft-lb using a calibrated wrench.
7. Top plug insulation (74) was put into place and the outer drum lid positioned and torqued to the appropriate tension of 33 ft-lbs.
8. The outer drum coves ring clamp (43) was installed and torqued to 75 ft-lb, to complete the closure of the package.
9. The package was placed into a cooling chamber for 12 hours and the temperature reduced to an ambient temperature of $-40°$ F. on the outer surface of the test package prior to the drop test.
10. The package was then removed from the cooling chamber and a thermocouple protector installed.
11. Drop test were conducted and the results recorded as follows:
a. The first test, a 4 foot drop through the center of gravity @ 58-60 degrees, onto the bolted closure ring (43) of the drum, which aligned with one of the top bolts on the outer package top, to create a worst case condition, was completed. The damage to the package consisted of an indention approximately 4"-6" long×¾" deep. Acceptable.
b. The second test, 30 foot drop through the same damaged area, in the same orientation was conducted. Damage consisted of a growth in the previously damaged area to approximately 12" long×2" deep, a minor ripple in the outer side wall, caused from the transfer of energy thru the package to the bottom and a minor dent in the bottom. Impact area top bolt cap sheared off, no openings. There were no tears opening to the inside or other unacceptable conditions found on the package. Acceptable.
c. Drop number three, the crush test, consisted of a carbon steel plate, weighing 1100 pounds, falling from a height of 30 feet from the top surface of the package, onto the package placed in a horizontal position. This was determined to be the worst case position using computer models and preliminary drop testing information previously conducted. Damage to the package was a flattening of the impact sides over areas 12" wide extending the entire length of the package. One tack weld on the reinforcing ring of the drum cover had a minor tear, which exposed an area approximately ½" long×⅛" high of the top foam plug. There was additional damage which occurred to the bottom edge of the package in the form a slit in the side wall of the outer drum which was accidentally placed over the test pads steel reinforcing plate edge which was exposed causing a shearing action to occur, this damage was in the form of a tight slit approximately 4" long. The possibility of welding the area was discussed, but after that discussion it was left as it was. Acceptable.

d. Drop number four, the Puncture test, was conducted using a 6" diameter×12" long solid steel bar welded to the test pad, with the package in the horizontal position and the impact area designated between the two vertical internal stiffeners and the middle drum rolling hoops. This drop provided damage to an area of the mid-section approximately 1½" deep×6" in diameter, and there were no tears to the surface of the package. Additional damage occurred when the package fell onto the crush test plate lifting point, which was left too close to the drop area, a small indentation occurred with no tearing. Acceptable.

12. Post drop condition photographs were taken and the test package was placed in the thermal soaking chamber and the temperature increased to approximately 120° F. overnight and upon removal wrapped with insulating blankets and electric heating strips for transport to the remote fire testing location.

13. The test package was placed onto the fire pool stand in the prescribed manner and location, the connections and pre-test evaluations completed. Wind shields were put into place to aid in wind control for the actual fire test.

14. The fuel was placed on top of the water bed in sufficient quantity to provide a fire to exceed 30 minutes fully engulfing the package with provisions made to add fuel as required.

15. The pool fire was ignited and the package engulfed. During the initial fire time period of 30 minutes, it was determined that the package lost some flame coverage and the decision was made by Century Industries and SwRI to add approximately 15 minutes to the duration of the fire. Direct contact flame temperatures ranged between 800 and 2150° F. over the 45 minute fire. North and South Slugs provided temperatures averaging about 95° F. at 20 minutes, 135° F. at 30 minutes, 178° F. at 40 minutes and 198° F. at 45 minutes. Two thermocouples located at the exact position of the previously noted accidental tear caused by the shearing action of the test pad plate during the crush test drop, were exposed to higher temperatures than the remaining thermocouples due to the chimney effect caused by the tear and the thermocouples exit point in the top edge of the package. It is reasoned and believed that without the tear in the bottom of the container these thermocouples would have performed in like manner as did the other 6 thermocouples and provided an internal average of around 120° F., over the entire test time. Even considering the accentual damage and the additional time added to the fire test, the average inner vessel temperature was approximately 135° F. Acceptable.

16. The package was shielded from the weather and allowed to cool overnight, and then transported to the immersion test facility.

17. The package was prepared for the immersion test and placed into the immersion chamber with a hydraulic pressure of 23±1 psig applied to the package for 15 minutes. No damage from this test was noted.

18. The package was transported to the leak test area and examined. The top foam plug was in place and in good physical condition upon opening of the container. Minor discoloration was noted within ½" of the edges of the plug. Portions of the drum gasket (33) under the outer bolts (31) was melted, but approximately ⅔ of the gasket was in place and pliable.

19. No damage was noted to the inner secondary cover (70) or gasket (72); bolts were still showing the original torque of 33 ft-lbs. and there was no water-in leakage from the immersion testing. Acceptable.

20. The helium leak-test equipment was calibrated and connected to inner vessel cover (46) and a vacuum pulled. The helium test was completed and showed a leak rate of $2.2$–$2.4 \times 10^{-8}$ std.-cc/sec. over 5 minute test time. Acceptable.

21. The bolt (25) torque was checked and two bolts found to be at approximately 28 ft-lbs. and the other 6 at the original 33 ft-lbs.

22. The package was opened and the o-ring gaskets inspected and found to be in pristine condition. The steel shot was removed in order to examine the internal vessel which was found to be in excellent condition.

The invention has been described in detail with particular reference to preferred embodiments thereof, but it will be understood that variations and modifications will be effected with the spirit and scope of the invention.

I claim:

1. A reusable container for hazardous material, said container having high impact resistance and leak containment characteristics and being readily handleable by conventional fork lift or the like equipment, said container having a longitudinal axis and comprising a substantially closed and continuous first wall means providing an inner containment vessel for said material and having an open top portion, a substantially closed and continuous second wall means providing a protective shell substantially surrounding said vessel and having inner side surface portions radially outwardly spaced from at least a major portion of outer surface portions of said vessel to provide a first protective spacing between said vessel and shell, an access port formed thru said second wall means at a top section thereof, said open top portion of said vessel being affixed to said top section of said second wall means which places said access port in direct communication with said open top portion for loading and unloading said vessel with said material, a vessel cover adapted to be removably affixed to said top section to sealingly cover said access port, third wall means providing a sealable drum having side portions, a bottom, an open top, and sealable drum lid means for closing said open top, wherein said protective shell has from four to eight generally longitudinally extending strengthening rib means affixed to and substantially equidistantly spaced around and welded to segments of said outer surface portions of said shell and extending generally longitudinally thereof substantially from the top to the bottom of said shell, whereby said outer surface portions of said shell are spaced from inner surface portions of said drum side over a major portion of said drum to provide a second protective spacing between said drum and shell, wherein the construction of said second wall means provides a generally cylindrical upper side wall portion which extends longitudinally upward beyond said top section to provide a third protective spacing, wherein said upper side wall portion is provided at its top with a ring member which is affixed to an upper inner surface portion of said side portion of said drum, and wherein protective material is provided in said spacings.

2. The container of claim 1 wherein said rib means and inner surface portions of said drum are dimensioned to allow said shell to be slid down into said drum with said rib means positioned closely adjacent said inner surface portions of said drum.

3. The container of claim 1 wherein said inner surface portions of said drum are substantially cylindrical in configuration.

4. The container of claim 3 wherein said drum is a conventional fifty five gallon ring ribbed steel drum.

5. The container of claim 1 wherein said ring member comprises a heavy steel circular rim welded to said upper side wall portion of said shell and to an upper inner surface portion of said drum.

6. The container of claim 1 wherein the protective material in said first and third protective spacings comprises foamed polyurethane, and the protective material in said second protective spacing comprises ceramic fiber blanket.

7. The container of claim 6 wherein the density of said polyurethane foam is from about 5.0 PCF (pound per ft.$^3$) to about 7.0 PCF.

8. The container of claim 1 wherein said rib means are tied together by a weld joint in a circular array to a reinforcing ring structure.

9. A reusable container for transporting radioactive or other potentially dangerous material and having a longitudinal axis and comprising an outer casing having a side wall, a bottom, an open top, and a lid means for sealing said open top, an intermediate shell having a side wall, a floor and an open top, said side walls being spaced radially inwardly from each other to form therebetween an outer protective cavity and to form within said shell an inner protective cavity, a material containment structure within said inner protective cavity and affixed to said side wall of said shell and providing a containment vessel having a top access port for allowing loading and unloading of said material into and from said vessel, removable cover means adapted for sealing said access port, said containment structure being spaced downwardly from said open top of said casing to form an upper protective cavity, impact and heat resistant protective material substantially filling said cavities, and from four to eight generally longitudinally extending rib means circumferentially and substantially equidistantly spaced around the periphery of said side wall of said shell within said outer protective cavity and affixed by welding to said side wall of said shell.

10. The container of claim 9 wherein said protective material in said upper protective cavity is in the form of a polymeric plug which can be slid out thru said open top of said casing for allowing unloading and reloading of said vessel thru said access port.

11. The container of claim 10 wherein said rib means and inner surface portions of said drum are dimensioned to allow said shell to be slid down into said drum with said rib means positioned closely adjacent said inner surface portions of said drum, and wherein upper portions of said shell are affixed to said drum.

12. The container of claim 10 wherein said inner surface portions of said drum are substantially cylindrical in configuration.

13. The container of claim 12 wherein said drum is a conventional fifty five gallon ring ribbed steel drum.

14. The container of claim 10 wherein said ring member comprises a heavy steel circular rim welded to said upper side wall portion of said shell and to an upper inner surface portion of said drum.

15. The container of claim 10 wherein the protective material in said upper protective cavity comprises foamed polyurethane, and the protective material in said outer protective spacing comprises ceramic fiber blanket.

16. The container of claim 15 wherein the polyurethane foam density is from about 5.0 PCF (pound per ft.$^3$) to about 7.0 PCF.

17. The container of claim 10 wherein said rib means are tied together by a weld joint in a circular array to a reinforcing ring structure.

* * * * *